United States Patent [19]

Tweadey, II et al.

[11] Patent Number: 5,648,758
[45] Date of Patent: Jul. 15, 1997

[54] PRE-ASSEMBLED GLASS BREAKAGE DETECTOR APPLIQUE

[75] Inventors: Robert F. Tweadey, II, Farmington Hills; Kenneth J. Gajewski, Woodhaven, both of Mich.

[73] Assignee: Ford Motor Company, Dearborn, Mich.

[21] Appl. No.: 552,409

[22] Filed: Nov. 3, 1995

[51] Int. Cl.⁶ .................................................. G08B 13/04
[52] U.S. Cl. ........................................ 340/550; 340/426
[58] Field of Search ................................ 340/550, 426

[56] References Cited

U.S. PATENT DOCUMENTS

| | | | |
|---|---|---|---|
| 3,549,770 | 12/1970 | Ham et al. | 340/550 |
| 3,609,739 | 9/1971 | Walter | 340/550 |
| 3,634,845 | 1/1972 | Colman | 340/550 |
| 3,763,795 | 10/1973 | Wetz, Jr. | 340/550 |
| 3,863,250 | 1/1975 | McCluskey, Jr. | 40/550 |
| 3,909,331 | 9/1975 | Cohen | 340/550 |
| 4,230,918 | 10/1980 | Schroeder et al. | 200/61.62 |
| 4,804,946 | 2/1989 | Elkowitz | 340/550 |
| 4,878,044 | 10/1989 | Hickman | 340/550 |
| 4,999,608 | 3/1991 | Glaomb | 340/550 |
| 5,005,020 | 4/1991 | Ogawa et al. | 343/713 |
| 5,114,756 | 5/1992 | Mirabeau et al. | 427/379 |
| 5,139,850 | 8/1992 | Clarke et al. | 428/192 |
| 5,198,723 | 3/1993 | Parker | 313/634 |

*Primary Examiner*—Glen Swann
*Attorney, Agent, or Firm*—Lorraine S. Melotik; Roger L. May

[57] ABSTRACT

A pre-assembled glass breakage detector applique has a carrier substrate which carries an electrical circuit subassembly. The electrical circuit subassembly includes an electrically conductive fragile film and spaced electrical connectors. A method of making a glazing unit security system includes pre-assembling one or more such glass breakage detector appliques and then applying the electrical circuit subassembly thereof, with or without the carrier substrate, to the surface of a glazing pane, and connecting electrical needs from continuity loss detection circuitry to the electrical connectors. In a motor vehicle application, the appliques can be applied to stationary and/or moveable vehicle windows, being especially advantageous for use on a hidden surface area of moveably mounted glazing panes. The fragile film loses electrical continuity upon disruption of the underlying glazing pane, such as upon overall fracture of a tempered glass pane upon significant fracture anywhere in the pane.

18 Claims, 3 Drawing Sheets

PRE-ASSEMBLED GLASS BREAKAGE DETECTOR APPLIQUE

FIELD OF THE INVENTION

The present invention is directed to a pre-assembled glass breakage detector applique suitable for use in a security system for detecting breakage of a frangible glazing pane.

BACKGROUND

Security systems are known for use in detecting breakage of a frangible glazing pane, for example, a glass windowpane in a motor vehicle. Such systems typically include means for detecting breakage of the pane and means for responding to such breakage, for example, by sounding an alarm or disabling the motor vehicle power train.

Complex electronic shock sensors have been suggested for detecting vibrations corresponding to glass breakage, such as in U.S. Pat. No. 3,863,250 to McCluskey, Jr. For use in a motor vehicle, however, such vibration detection systems involve undesirably high costs in producing the shock sensors and attaching them to each glass pane in the vehicle.

Alternative security systems have employed electrical continuity loss detection circuitry. In such systems a conductive coating or strip is formed on or in the glazing pane. In U.S. Pat. No. 3,609,739 to Walter, a glazing security system employs an electrically conductive strip forming a closed loop around the outer perimeter of the glass pane. Such full perimeter strips, however, present appearance problems for motor vehicle windows and, in addition, present an unacceptable risk of accidental disruption of the electrical continuity of the strip by scratching or the like, due to the extent to which it is exposed to view and unintended contact. Such security systems are further disadvantaged by the need to form or apply the conductive material prior to installing the glazing pane into the motor vehicle body. This can add considerable complexity and cost to the installation of motor vehicle glazing panes. Also, repair of the security system due to accidental disruption of the electrical continuity of the conductive coating or strip may require replacement of the entire glazing pane.

It is an object of the present invention to provide a motor vehicle glazing security system and certain componentry for such a system, which is economical to produce in the context of motor vehicle assembly and has good aesthetic qualities. It is a further object of at least certain preferred embodiments of the invention to provide a motor vehicle glazing security system, or componentry for such a system, having good durability over prolonged use and good repairability properties. Further objects and features of the invention will be apparent from the following disclosure and detailed description of preferred embodiments.

SUMMARY

In accordance with a first aspect, a pre-assembled glass breakage detector applique is provided, comprising an electrical circuit subassembly on a carrier substrate. The electrical circuit subassembly includes an electrically conductive, fragile film carried on a surface of the carrier substrate, and electrical connectors carried by the carrier substrate at spaced locations and in electrical connection with the fragile film. As discussed further below, the carrier substrate may be adherable to the substrate or disposable, having a releasing surface from which the fragile film is releasable for attachment to a glazing pane without loss of electrical continuity. In accordance with certain preferred embodiments the carrier substrate may be frangible and suitable for attachment, by adhesive or the like, to the surface of a glazing pane. In accordance with such alternative embodiments, fracture of the glazing pane, particularly a tempered glass pane which undergoes overall breakage in the event of any significant fracture, causes fracture of the frangible carrier substrate, with resultant disruption of the electrical continuity of the fragile film. The fragile film can be formed of any suitable material which is sufficiently robust to withstand handling of the pre-assembled applique, and yet sufficiently fragile that breakage of the underlying glazing pane will result in loss of its electrical continuity.

In accordance with another significant aspect, a method is provided for making a glazing unit security system, comprising the steps of pre-assembling a glass breakage detector applique as described above, and then applying such pre-assembled applique, with or without the carrier substrate, to a surface of a glazing pane. Electrical leads from continuity loss detection circuitry are connected to the electrical connectors of the applique. In accordance with certain preferred embodiments of this method of making a glazing unit security system, a layer of adhesive material, such as epoxy, etc., is applied between the applique and the glazing pane. In alternative preferred embodiments, the applique is self-adhered to the surface of the glazing pane.

Those who are skilled in the art, that is, those who have expertise in this area of technology, will recognize that the present invention is a significant technological advance, with important commercial advantages. Pre-assembly of the applique provides a cost effective means of producing a glazing pane breakage detector circuit. The electrical circuit subassembly comprising the fragile electrically conductive film and the electrical connectors described above, on a carrier substrate, can be produced "off-line" for application at any suitable time to the surface of a glazing pane. It can be applied, for example, by the fabricator of a motor vehicle window subassembly or, even earlier, when a glazing pane is first produced. Greater flexibility is achieved over known security systems in employing electrically conductive coatings on the surface of a glazing pane. A rapid cure epoxy adhesive can be used, for example, to apply the applique, since the conductive properties of the electrical circuit subassembly of the applique are established prior to its adhesion to the glazing pane. Further, advantageously low manufacturing costs can be achieved, since the applique can be manufactured in volume with specified electrical resistance values. These and additional features and advantages will be further understood from the following detailed description of certain preferred embodiments.

BRIEF DESCRIPTION OF THE DRAWINGS

Certain preferred embodiments of the pre-assembled glass breakage detector applique are described below with reference to the appended drawings wherein.

It should be understood that the pre-assembled glass breakage detector applique disclosed here may have dimensions and configurations differing from those of the embodiments illustrated in the appended drawings. A frangible carrier substrate need not be flat, for example, but rather can be curvoplanar for adhesive attachment to a correspondingly curvoplanar surface area of a glazing pane. In addition, the thickness and lateral dimensions and configuration (that is, in a plane parallel to the surface of the glazing pane) will be determined largely in accordance with the needs of each particular application. Selecting suitable dimensions and configurations will be well within the ability of those skilled in the art, given the aid of this disclosure. It should further be understood that the dimensions of certain features or aspects shown in the appended drawings have been enlarged or otherwise modified for clarity of illustration. Thus, for example, the electrically conductive fragile film of the applique may be thinner relative to the carrier substrate than in the embodiments illustrated.

DETAILED DESCRIPTION OF CERTAIN PREFERRED EMBODIMENTS

In motor vehicle applications, for which the pre-assembled glass breakage detector applique is especially advantageous, multiple appliques can be preassembled and applied, one or more each, to multiple glazing panes of the motor vehicle. Typically, a number of the glazing panes will be moveable between an open and a closed position, while a number may be installed in a fixed position. A security system circuit can then be formed by establishing electrical connection between the electrical circuit subassemblies of the appliques which have been applied to the various glazing panes, and continuity loss detection circuitry mounted at any convenient location in the motor vehicle. The electrical subassemblies of the individual appliques can be put into series electrical connection with each other, as illustrated in FIG. 7, discussed further below, or in parallel electrical connection.

Figure 7:
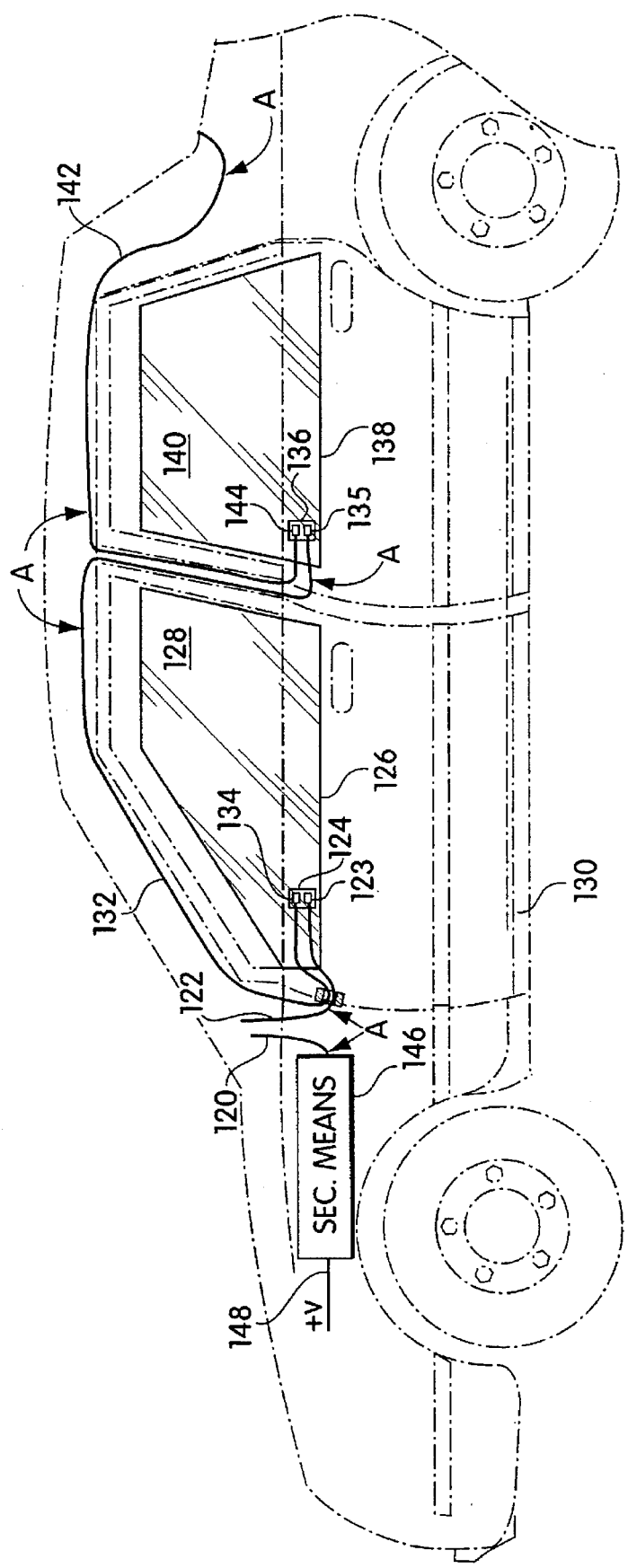
FIG. 7 is a schematic perspective view of a motor vehicle comprising a glazing security system in accordance with a preferred embodiment of the invention.

The position of a glazing pane in a motor vehicle door window, as illustrated in FIG. 7, typically is vertically adjustable between a closed or fully up position, and an open or down position. Even in its closed position, however, only an upper portion of the glazing pane typically is exposed to view. A lower portion of the glazing pane remains at all times below the so-called beltline of the motor vehicle door at the bottom of the window opening. The electrical circuit subassembly of the pre-assembled glass breakage detector applique disclosed here preferably is applied to a moveable glazing pane on such a surface area, which is hidden from view during normal operation. Additionally, the electrical circuit subassembly of the applique typically will be applied to a surface area of a glazing pane which is accessible to electrical connection means to form a circuit with continuity loss detection circuitry as mentioned above.

Suitable techniques for making electrical connection to the electrical contacts of the applique include both releasable and non-releasable attachment means. As used here, releasable attachment is intended to mean that the electrical connection can be disconnected without substantial permanent damage to the electrical connectors or fragile film of the applique, such that electrical connection can thereafter be reestablished. Suitable electrical connection means include, for example, soldering, conductive adhesives, slide-on clips and the like. Additional suitable techniques will be apparent in view of the present disclosure.

Figure 1:
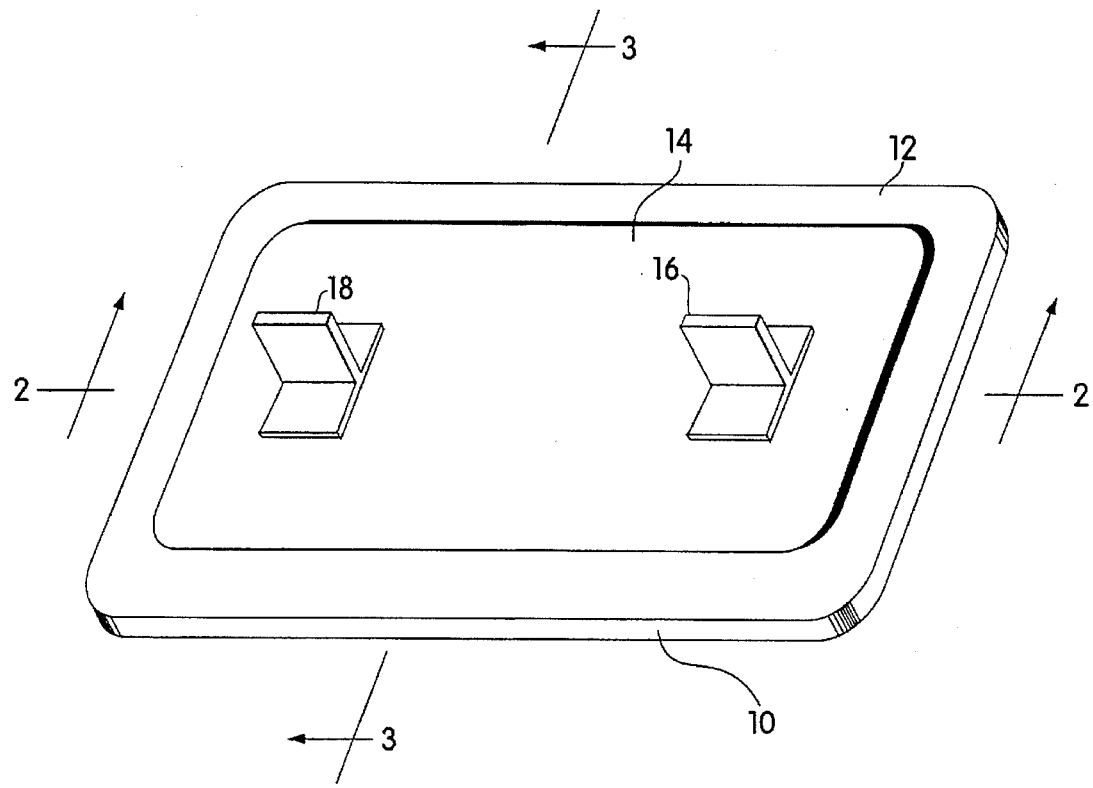
FIG. 1 is a schematic perspective view of a pre-assembled glass breakage detector assembly in accordance with one preferred embodiment.
Figure 2:
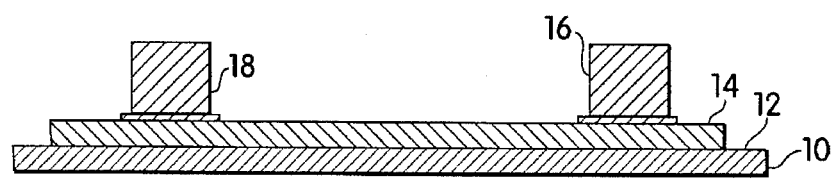
FIG. 2 is a section view taken through line 2—2 of FIG. 1.
Figure 3:
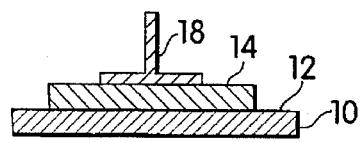
FIG. 3 is a section view of the applique taken through 3—3 of FIG. 1.

A pre-assembled glass breakage detector applique in accordance with a preferred embodiment is illustrated in FIGS. 1–3. A carrier substrate 10 is seen to carry on its upper surface 12 an electrically conductive fragile film 14 and spaced electrical connectors 16, 18. The electrical connectors can be provided as bonding pads substantially in the plane of the fragile film or, as illustrated in the embodiment of FIGS. 1–3, in the form of upstanding, substantially rigid metal tabs. Alternative electrical connectors will be apparent to those skilled in the art in view of the present disclosure.

The fragile, electrically conductive film can be formed of various different materials and by various techniques. Most significant is that the film be sufficiently fragile as to have insufficient structural integrity to maintain electrical continuity upon shattering of the underlying glazing pane. Suitable materials for forming the conductive film are commercially available, and will be apparent to those skilled in the art in view of this disclosure. Suitable film-forming conductive inks are available, for example, Product No. 114-11 from Creative Materials, Inc. (Tyngsboro, Mass.), and Ormet 2005 conductive ink from Toranaga Technologies, Inc. Conductive epoxies and other curable polymeric materials also are commercially available and suitable for certain preferred embodiments. Various conductive epoxies are known to those skilled in the art, and the curing procedure will depend upon the conductive epoxy selected. Certain conductive epoxies, for example, are self-curing at ambient conditions, or by exposure to ultraviolet or other actinic radiation, by thermal curing upon exposure to elevated temperatures, or the like. Suitable conductive epoxy material is disclosed, for example, in U.S. Pat. No. 5,114,756 to Mirabeau. Alternative suitable conductive epoxies are commercially available, and will be apparent to those skilled in the art in view of this disclosure. Such liquid and semi-liquid film-forming materials can be applied, for example, by a roller traveling on the surface of the carrier substrate of the applique. This fabrication technique can be especially advantageous for those certain embodiments (see, for example, the discussion of FIGS. 5 and 6 below), wherein the carrier substrate is not disposable, but rather is applied to the surface of the glazing pane along with the electrical circuit subassembly of the applique. Silk screening and like application processes also are suitable. Once cured or dried, such liquid or semi-liquid materials are understood to form an electrically conductive, frangible or otherwise fragile film. Thin foil also may be suitable in certain applications, such as copper or aluminum foil. Particularly in embodiments having rigid carrier substrates adhered to the glazing pane with the electrical circuit subassembly, the fragile film can be formed by vapor deposition or other such deposition process. In accordance with highly preferred embodiments, the glazing pane on which the pre-assembled applique is adhered, is tempered glass. Tempered glass undergoes overall shattering upon sustaining any significant fracture anywhere in the expanse of the glass. Thus, since the pre-assembled applique, as applied to the glazing pane, has little or no structural integrity of its own, any significant fracture of the glazing pane will cause fracturing of that portion of the pane under the applique. Such fracturing will disrupt the fragile film of the applique and cause discontinuities therein. The resulting loss of electrical continuity will be detected by the associated continuity loss detection circuitry of the security system. In this regard, motor vehicle rear and side windows comprise laminated structures wherein tempered glass is laminated to a polyvinyl butyral ("CPVB") or other resilient ply. Thus, upon shattering, the glass underlying the fragile film may remain substantially in place, adhered to the resilient ply. Known metal tape strips currently in use for window security systems are typically too elastomeric and too robust to lose electrical continuity upon controlled shattering of such laminated glazing panes. In contrast, the fragile film of the pre-assembled applique disclosed here, including embodiments wherein the carrier substrate is disposable and those wherein the carrier substrate remains with the electrical circuit subassembly applied to the glazing pane, are substantially non-elastomeric and in other respects fragile so as to lose electrical continuity, even upon such controlled shattering of a tempered laminated glazing pane. That is, breakage of a laminated glazing pane, even at a location remote from the applique, resulting in only minor disruption of the portion of the glazing pane underlying the applique, is sufficient to terminate electrical continuity of the fragile film for detection by the security system. The fragility of the electrically conductive film of the applique insures that even such minor disruption of the underlying glazing pane will result in a loss of electrical continuity of the film.

Figure 4:
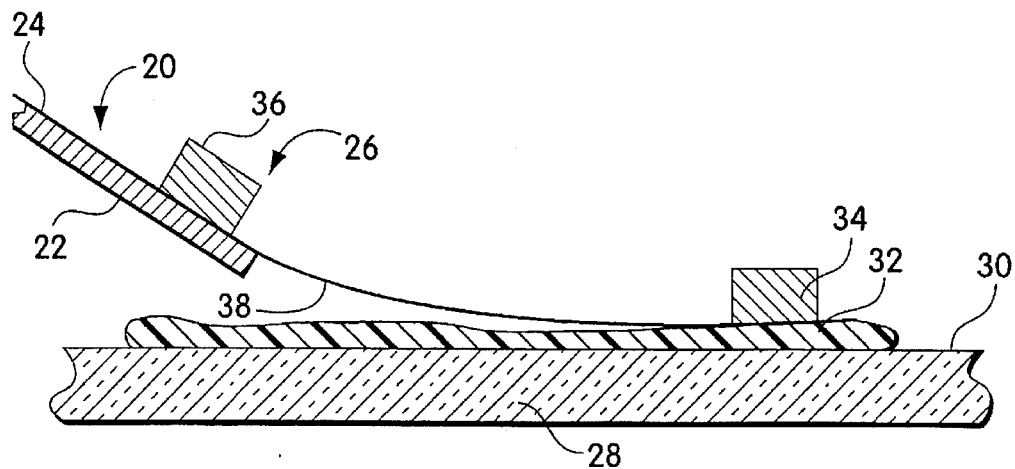
FIG. 4 is a schematic elevation view, partially broken away and partially in section, of a pre-assembled glass breakage detector applique in accordance with a preferred embodiment wherein the electrical circuit subassembly of the applique is being applied to the surface of a glazing pane from the releasing surface of a disposable carrier substrate.

A pre-assembled glass breakage detector applique in accordance with a preferred embodiment is illustrated in FIG. 4 being applied to a glazing pane. Specifically, applique 20 is seen to comprise a disposable carrier substrate 22 having a releasing surface 24. An electrical circuit subassembly 26 carried on releasing surface 24 has been partially removed and applied to surface 30 of glazing pane 28 by means of a thin layer of epoxy adhesive 32. Any of numerous commercially available rapid cure epoxy adhesives or other suitable adhesives can be used, since the conductive properties of the electrical circuit subassembly were preestablished in the applique prior to adhesion to the glazing pane. Suitable adhesives include, for example, non-conductive, one-component epoxy adhesives and the like. The electrical circuit subassembly is seen to comprise a pair of spaced connector tabs 34, 36 and an electrically conductive fragile film 38. The disposable carrier substrate 22 can be formed of paper, for example, with a silicon releasing surface 24. Other suitable disposable carrier substrates will be readily apparent in view of the present disclosure. Either before or after the epoxy adhesive 32 has cured, electrical leads from the security system are attached to connector tabs 34, 36.

Figure 5:
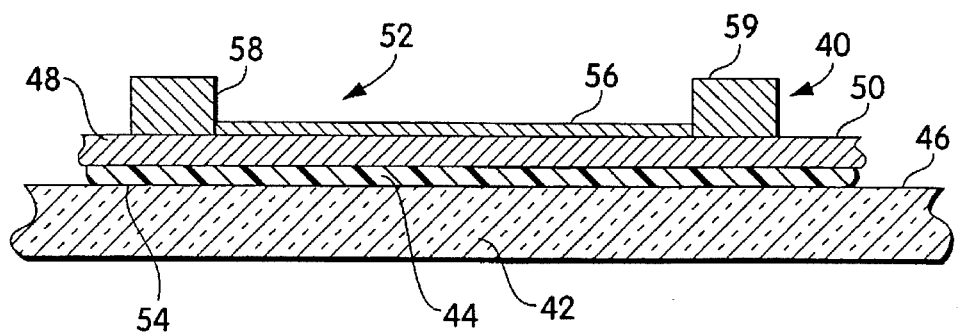
FIG. 5 is a schematic elevation view, partially broken away and partially in section, of another preferred embodiment of the pre-assembled glass breakage detector applique in accordance with another preferred embodiment comprising a frangible carrier substrate, shown adhesively applied to the surface of a glazing pane.

In accordance with another preferred embodiment illustrated in FIG. 5, the preassembled applique 40 has been applied to glazing pane 42 by means of an adhesive layer 44 applied to surface 46 of the glazing pane shortly prior to applying the applique. The applique 40 includes a non-disposable carrier substrate 48, which has an upper surface 50 which carries the electrical circuit subassembly 52 of the applique, and a lower surface 54 which contacts the adhesive layer 44. In accordance with specially preferred embodiments, the non-disposable carrier substrate 48 is formed of a brittle material, rigid and frangible, such as a thin epoxy or other polymer wafer or the like. The acceptable degree of rigidity of the carrier substrate will depend, in part, on the size of the applique and on the degree to which it conforms in the free state, that is, in the pre-assembled applique prior to being adhered to the glazing pane, to the surface configuration (e.g., curvature, etc.) of the underlying surface 46 of the glazing pane 42. Smaller appliques intended for application to a relatively flat glazing pane surface, can be fabricated with substantially rigid and flat carrier substrates. Such rigid carrier substrates are generally advantageous in view of the relative ease with which they are handled for application to the glazing pane. The electrical subassembly of the applique of FIG. 5 is seen to comprise an electrically conductive fragile film 56 and electrical connector tabs 58, 59.

Figure 6:
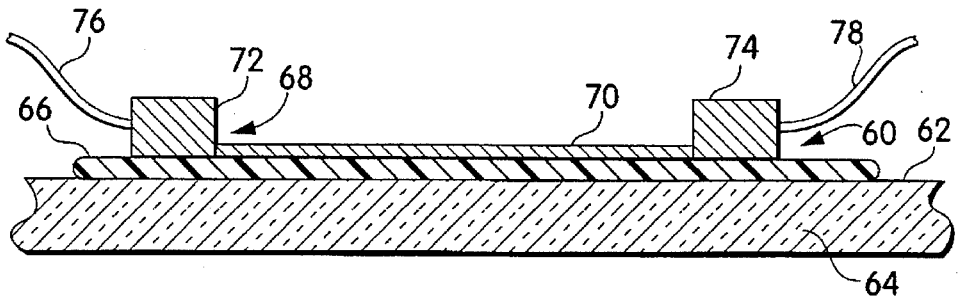
FIG. 6 is a schematic elevation view, partially broken away and partially in section, of a pre-assembled glass breakage detector applique in accordance with another preferred embodiment, wherein the electrical circuit subassembly of the applique is adhered to the surface of a glazing pane by means of its carrier substrate comprising a decal film.

In the preferred embodiment illustrated in FIG. 6, a pre-assembled applique 60 has been applied to surface 62 of glazing pane 64. The applique comprises a non-disposable carrier substrate, specifically, a decal substrate 66. Electrical subassembly 68 carried by the decal substrate 66 is seen to comprise fragile film 70 and electrical connector tabs 72, 74. The decal substrate 66 preferably is water activated. That is, it becomes self-adherent upon exposure to water (including, for example, liquid water, steam, aqueous solvent or the like), and then allowed to dry in contact with surface 62 of the glazing pane 64. In contrast to the brittle carrier substrate 48 in the embodiment of FIG. 5, the decal substrate 66 in the embodiment of FIG. 6 typically will be sufficiently fragile and non-elastomeric, and otherwise lacking in structural integrity following wetting and application to the glazing pane, as to impact adversely little or none at all on the advantageous fragility of the electrically conductive film 70. Electrical leads 76, 78 are in electrical connection with connector tab 72, 74, respectively. Electrical leads 76, 78 provide electrical connection of the subassembly 68 to continuity loss detection circuitry of the security system, either directly or through series connection with other pre-assembled appliques adhered to other glazing panes of the system. Referring now to FIG. 7, it can be seen that electrical leads 120 and 122 from the first and second connector tabs, respectively, of a pre-assembled applique in accordance with the invention, attached at the lower peripheral edge of the vehicle windshield (not shown) forms part of a series electrical connection with the electrically conductive fragile films of appliques attached to other windows in the security system. Specifically, electrical lead 122 is seen to be in electrical connection with a first connector tab 123 of fragile film 124 provided at the lower peripheral edge 126 of adjustable position window 128 in front passenger door 130 of the vehicle. Electrical lead 132 extends from the second connector tab 134 of fragile film 124. Second tab 134 is seen to be located close to first tab 123, facilitating use of a single wiring bundle to the applique at the from of door 130. Electrical lead 132 extends within the vehicle body over the top of door 130 to establish series electrical connection at tab 135 with a third conductive film 136 at the lower peripheral edge 138 of rear passenger door window 140. It can be seen in FIG. 7 that windows 128 and 140 are slightly lowered from their full up position. It can be seen further that even in their full up position, the appliques would not be visible and would not normally be exposed to damage through inadvertent contact in normal use of the vehicle.

Electrical lead 142 from the second tab 144 of conductive film 136 can advantageously be provided in a single wiring bundle with electrical lead 132, until it separates to continue the series of electrical connections, by forming electrical connections with a conductive strip provided along the lower peripheral edge of the rear window (not shown) of the vehicle.

In the embodiment illustrated in FIG. 7, a fracture in the tempered glass of a vehicle window would result in an overall shattering of the window and a consequent loss in electrical continuity of the conductive film of the applique attached to that window. Such loss of electrical continuity would be detected by security means 146 which has electrical power feed 148 from a vehicle battery or other power source. Security means 146 is adapted to respond upon detecting a loss of continuity, for example by actuating an audible alarm and/or a visual alarm. Preferably the security means includes a disabling means which, when actuated, prevents normal operation of the vehicle, permitting either limited or no vehicle operation. These and other alarm and disablement means are commercially available and will be readily apparent to those skilled in the art in view of the present disclosure.

In view of the foregoing disclosure and discussion of various preferred embodiments of the invention, those skilled in the art will readily perceive suitable modifications and alternative embodiments within the true scope and spirit of the invention. All such modifications and alternative embodiments are intended to be included within the scope of the appended claims.

We claim:

1. A pre-assembled glass breakage detector applique comprising a carrier substrate and an electrical circuit subassembly carried by the carrier substrate, the electrical circuit subassembly comprising an electrically conductive, fragile film carried on a surface of the carrier substrate, and electrical connectors in electrical connection with the fragile film at spaced locations.

2. The pre-assembled glass breakage detector applique in accordance with claim 1 wherein the carrier substrate is a disposable carrier film from which the electrical circuit subassembly is releasable without loss of electrical continuity of the fragile film.

3. The pre-assembled glass breakage detector applique in accordance with claim 2 wherein the disposable carrier film is a paper web having a silicon coated releasing surface carrying the electrical circuit subassembly.

4. The pre-assembled glass breakage detector applique in accordance with claim 1 wherein the carrier substrate is a brittle wafer suitable for attachment to a glazing pane.

5. The pre-assembled glass breakage detector applique in accordance with claim 4 wherein the brittle wafer is formed of cured polymeric epoxy material.

6. The pre-assembled glass breakage detector applique in accordance with claim 1 wherein the carrier substrate is a decal film self-adherable to a glazing pane.

7. The pre-assembled glass breakage detector applique in accordance with claim 6 wherein the decal film is self-adherable to a glazing pane upon exposure to water.

8. The pre-assembled glass breakage detector applique in accordance with claim 1 wherein the electrical connectors are metal tabs upstanding in a plane substantially perpendicular to the fragile film.

9. A method of making a glazing pane security system comprising the steps of:

pre-assembling a glass breakage detector applique comprising a carrier substrate and an electrical circuit subassembly carried by the carrier substrate, the electrical circuit subassembly comprising an electrically conductive fragile film and first and second electrical connector means at spaced locations on the fragile film for attachment to first and second electrical leads, respectively; and then applying the electrical circuit subassembly to a surface of the glazing pane and connecting first and second electrical leads from continuity loss detection circuitry to the first and second electrical connectors, respectively.

10. The method of making a glazing pane security system in accordance with claim 9 wherein the carrier substrate is removed from the electrical circuit subassembly prior to the step of applying the electrical assembly to the surface of the glazing pane.

11. The method of making a glazing pane security system in accordance with claim 10 wherein the carrier substrate is a disposable carrier film comprising a paper web having a silicon coated releasing surface carrying the fragile film and electrical connectors.

12. The method of making a glazing pane security system in accordance with claim 9 wherein the carrier substrate is applied to the surface of the glazing pane with the electrical circuit subassembly.

13. The method of making a glazing pane security system in accordance with claim 12 further comprising the step of applying a layer of adhesive to the surface of the glazing pane, wherein the carrier substrate is a brittle wafer and the glass breakage detector applique is applied to the surface of the glazing pane by contacting the brittle wafer to the layer of adhesive.

14. The method of making a glazing pane security system in accordance with claim 9 wherein the carrier substrate is a water activated decal film, and the step of applying the electrical circuit subassembly to the surface of the glazing pane comprises first exposing the decal film to water.

15. A method of producing a motor vehicle security system for detecting breakage of any of multiple frangible glazing panes mounted in a motor vehicle, comprising the steps of:

pre-assembling one or more glass breakage detector appliques comprising a carrier substrate and an electrical circuit subassembly carried by the carrier substrate, the electrical circuit subassembly comprising an electrically conductive fragile film, and first and second electrical connector means at spaced locations on the fragile film for attachment to first and electrical leads, respectively;

applying at least one electrical subassembly to each of multiple frangible glazing panes of a motor vehicle body; and forming a security system circuit by establishing electrical connection between the electrical circuit subassemblies and continuity loss detection circuitry by attaching electrical leads from the continuity loss detection circuitry to the first and second electrical connector means of each electrical subassembly.

16. The method of producing a motor vehicle security system in accordance with claim 15 wherein a plurality of the glazing panes are moveably mounted in the motor vehicle body for movement during normal operation between an open position and a closed position, and the corresponding electrical subassemblies are each applied to a surface area of a glazing pane, which is hidden from view during normal operation.

17. The method of producing a motor vehicle security system in accordance with claim 15 wherein a plurality of the electrical circuit subassemblies are in series electrical connection with each other.

18. The method of producing a motor vehicle security system in accordance with claim 15 wherein the electrical leads are releasably attached to the electrical connector means.

* * * * *